United States Patent [19]

Eames

[11] 4,241,859
[45] Dec. 30, 1980

[54] MOUNTABLE CASSETTE OR CARTRIDGE HOLDER

[76] Inventor: Thomas R. Eames, 4503 Wilburn Dr., South Euclid, Ohio 44121

[21] Appl. No.: 856,190

[22] Filed: Nov. 30, 1977

[51] Int. Cl.³ .............................................. B60R 7/00
[52] U.S. Cl. ..................................... 224/312; 206/387
[58] Field of Search ................. 224/29 B, 29 A, 29 T, 224/29 H, 29 G, 42.42 R, 42.46 R, 42.1 C, 42.1 R; 206/329, 387, 480, 493, DIG. 804; 211/86; 296/37.1, 37.8; 312/35, 71, 16, 18, 19, 15, 319; 221/87, 88

[56] References Cited

U.S. PATENT DOCUMENTS

| 2,211,879 | 8/1940 | Cave | 224/42.42 R |
|---|---|---|---|
| 2,287,581 | 6/1942 | Walker | 224/29 A |
| 3,612,432 | 10/1971 | Johnson | 206/387 |
| 3,620,367 | 11/1971 | Stembel | 206/387 |
| 3,777,881 | 12/1973 | Schwartz | 206/387 |
| 3,847,316 | 11/1974 | McInnes | 224/42.42 R |
| 3,995,737 | 12/1976 | Ackeret | 206/387 |

FOREIGN PATENT DOCUMENTS 2311379 11/1975 France ...................................... 206/387

Primary Examiner—Stanley H. Tollberg
Assistant Examiner—Kenneth Noland

[57] ABSTRACT

A holder for a plurality of cassette or cartridge tapes which are placed in individual adjoining frames for attaching to a mounting surface such as the sun visor of a motor vehicle. Each frame holds the cassette or cartridge such that it may be viewed from the flat side, held secure in any orientation of the frame, and released by displacing a retaining tab on a movable wall of the frame, or by overcoming a friction fit. The holder may be attached to the mounting surface be standard means such as metal clips, straps, springs, screws, bolts, or adhesive means.

2 Claims, 7 Drawing Figures

MOUNTABLE CASSETTE OR CARTRIDGE HOLDER

BACKGROUND OF THE INVENTION

As is well known to drivers, the increased popularity of tape decks in the automobile, especially cassette tapes, creates a need for securely storing, readily identifying, and easily changing the tapes as they are played. Existing storage containers for such tapes are either too bulky, difficult to mount in a motor vehicle, oriented so that identifying labels are hard to see, or are difficult to remove from the container with one hand, especially when concentrating on driving.

Accordingly, it is the object of the present invention to provide a novel holder for these tapes which takes advantage of the visual ability to view and identify the tapes on the sun visor, while still keeping visual contact with the road when driving.

Another object of the present invention is to be able to secure or remove each tape independently completely with one hand, while keeping the other hand on the driving wheel at all times. In the preferred embodiment, the tape will be ready for insertion in the tape deck when taken out of the holder.

Still another object of the present invention is to preserve the decor of the vehicle interior, and reduce the likelihood of tape theft by uniquely utilizing the relatively light weight and thin configuration of the tapes by mounting them on the sun visor so that they may be folded out of sight when the visor is in the normal driving position.

SUMMARY OF THE INVENTION

In one preferred embodiment of the present invention, the mountable holder is made up of one or more adjoining frames consisting of a back attached to at least 3 of the 4 peripheral upstanding walls forming a generally rectangular receptacle which is open on the front. Two of the opposing walls have tabs which extend over the top of the cassette or cartridge to hold it in place when it is inserted into the receptacle regardless of the subsequent orientation of the frame. One of the walls with the tabs is attached to the frame on only one side so that is may be moved a sufficient distance to permit the cassette or cartridge to be moved past the tab during insertion or removal. Upstanding detents protrude from the back of each frame such that they loosely slip into the circular opening of the tape reels within the cassettes to prevent the reels from turning. The plurality of frames may then be mounted to the visor by means of clips which position the back of the frames against the flat side of the visor.

DESCRIPTION OF THE DRAWINGS

In the accompanying drawings forming part hereof similar parts have been given the same reference numerals, in which drawings.

DESCRIPTION OF THE PREFERRED EMBODIMENT

Figure 1:
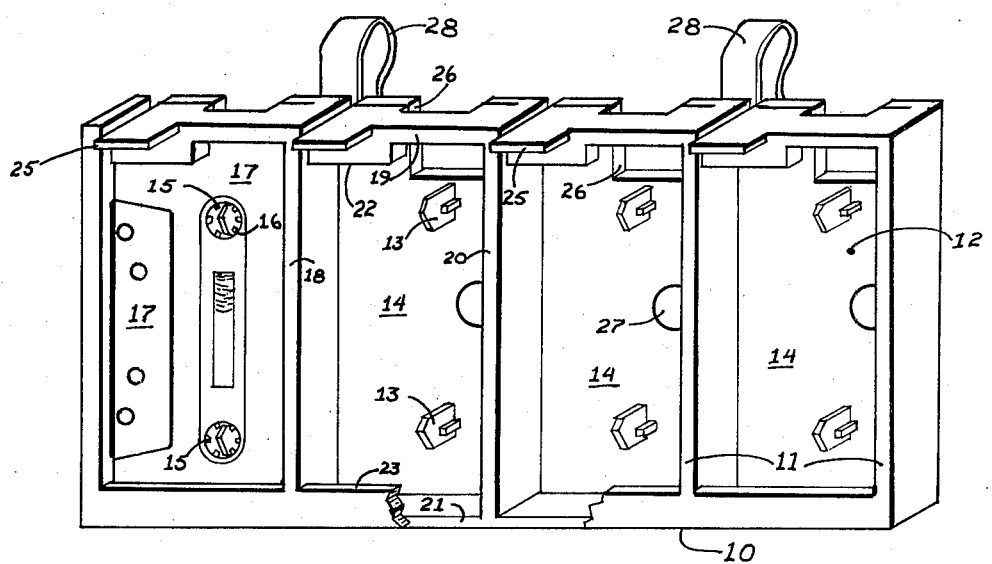
FIG. 1 is a perspective view from the front of one complete embodiment of the present invention with certain portions broken away for clarity.
Figure 2:
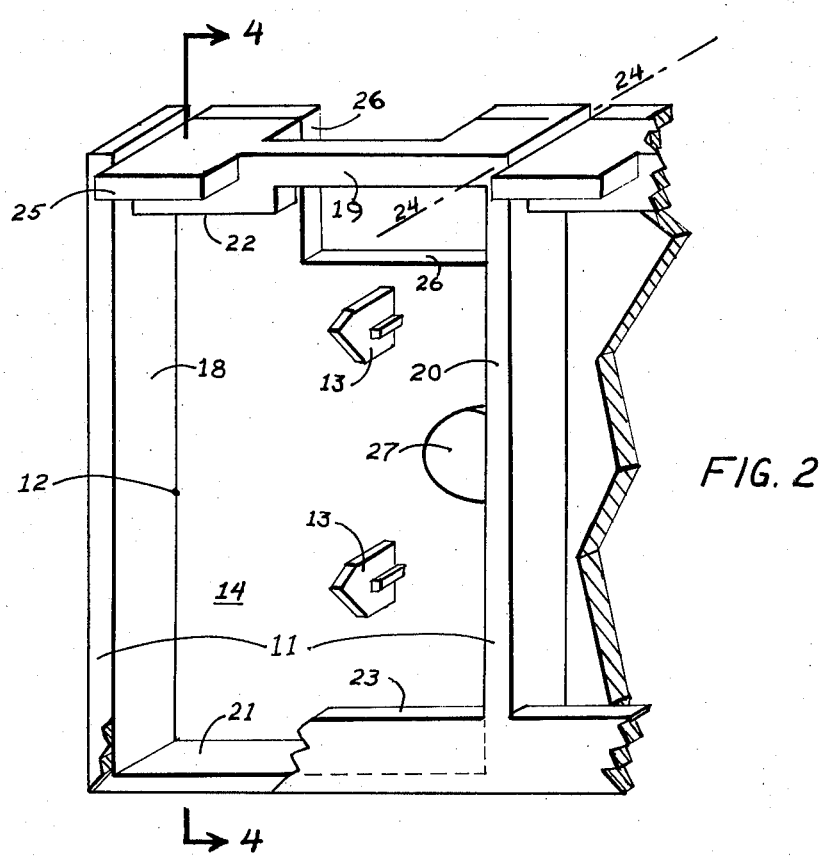
FIG. 2 is a fragmentary view in perspective from the front showing more detail of the frame.

Referring to the drawing and particularly FIGS. 1 and 2 which show the holder 10 comprised of a plurality of individual frames 11 formed together in a side-by-side configuration from some resilient material such as polyurethane, nylon acetate, or the like having adequate rigidity to be self supporting, and an inherent springiness when fixed. The holder 10 may be vacuum formed or pressed between male and female dies in accordance with well-known techniques to provide a series of receiving cavities 12 for the cassettes.

Each of the frames 11 represents a cavity 12 with four upstanding peripheral walls 18, 19, 20, and 21 substantially rectangular in shape and size to freely receive a cassette therein, and a back 14. Upstanding detents 13 are formed in the back 14 of the cavity. These detents are of a size and shape which will enable them to slip loosely into the circular opening 15 of the cassette 17 and engage with the sprocketed tape reel hubs 16 to prevent the reel hubs 16 from turning when the cassette 17 is seated in frame 11.

Two opposing walls 19 and 21 of the frame are of sufficient height that overhanging tabs 22 and 23 may be formed parallel to the back 14 toward the interior of the frame 11 so that the tabs 22 and 23 will protrude past the cassette 17 at each end when it is positioned in the frame (see FIG. 1), and will serve to hold the cassette 17 in the frame 11. The tabs 22 and 23 extend in the same plane as the cassette 17, so that the surface of the tab which contacts the cassette transmits its force perpendicular to the plane of the cassette to hold it against the back 14 of the frame 11. Since the tabs 22 and 23 extend past the cassette 17, they do not depend on any special flanges or other special shapes on the cassette 17 to provide a surface of contact that will hold the cassette 17 in place. This permits the tabs to be extended far enough past the cassette to assure that it will be held in the frame, even under conditions of shock or vibration which might be encountered under the driving conditions of an automobile.

One of the opposing walls is attached to the frame 11, on only one side making it a movable wall 19. The line 24 (FIG. 2) where the movable wall 19 is attached to wall 20 will act as a pivot when the movable wall 19 is pushed away from the interior portion of the frame. The resilient nature of the frame material will allow the movable wall 19 to bend a sufficient amount when pushed that the tab 22 may be moved away from the interior of the frame 11 enough to permit the cassette 17 to be moved past tab 22 for insertion or removal (see FIG. 4A, 4B and 4C). An additional tab 25 protrudes in the same plane as wall 19, and extends past tab 22 to provide a surface which may easily be pushed with the thumb or another finger when inserting or removing the cassette. The resiliency of movable wall 19 acts as a spring to return it to the closed position when it is not being pushed.

An opening 26 is provided in the lower portion of the movable wall 19 and the adjacent portion of the back 14 of the frame 11 so that a finger may be inserted through the opening 26 to urge the cassette 17 upward past tab 22 when the movable wall 19 is in the open position.

Note that the unique features of the movable wall 19 are still realized if the wall is attached at the junction with the back 14 rather than adjacent wall 20, however the distance to the pivot line is shorter, and reduces the effective leverage for a given application of pressure at tab 25.

A standoff 27 is positioned on the back 14 midway between walls 19 and 21, but closer to wall 20 than wall 18. This standoff shall protrude from the back 14 a sufficient distance to hold the cassette 17 snugly against tabs 22 and 23.

Figure 4A:
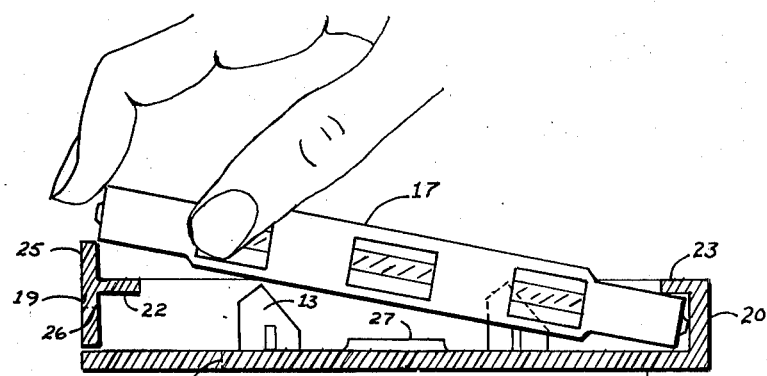
FIG. 4A is a sectional view taken on line 4—4 in FIG. 2 showing initial insertion of the cassette.
Figure 4B:
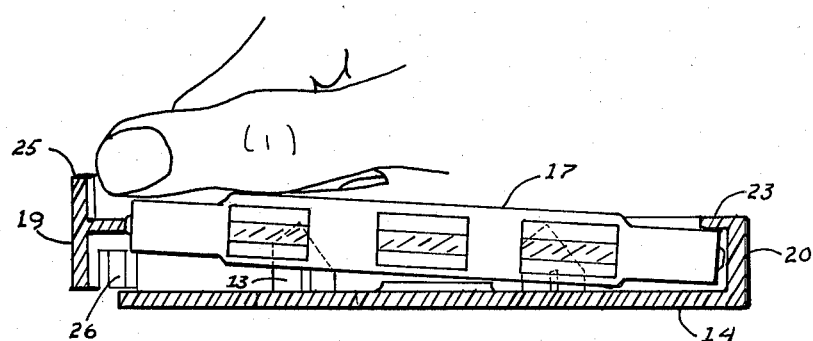
FIG. 4B is a sectional view taken on line 4—4 in FIG. 2 showing displacement of the movable wall to permit insertion of the cassette past the retaining tab.
Figure 4C:
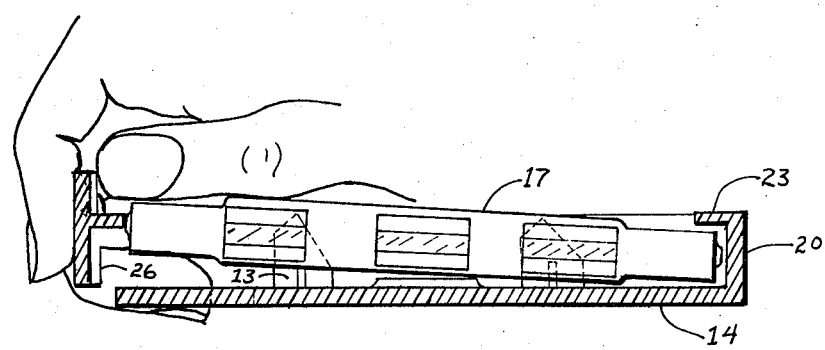
FIG. 4C is a sectional view taken on line 4—4 in FIG. 2 showing use of the second finger for removal of the cassette while the movable wall is held in the open position.

The manner in which the cassette 17 is inserted or removed from the holder is shown in FIGS. 4A, 4B, and 4C. The end of the cassette 17 is first pushed under tab 23 and positioned over the upper and lower detents 13. Using the thumb against tab 25, movable wall 19 is pushed back until the cassette 17 can be pushed past tab 22 over the detents 13, and against the standoff 27. Additional pressure on the top of the cassette near tab 22 will pivot the cassette around standoff 27 and raise the opposite end of the cassette into contact with tab 23. Continued pressure on the cassette will push it past tab 22 and movable wall 19 will return to its closed position with tab 22 extending over the cassette 17 holding is firmly in place. Removal is the reverse procedure except that the second finger may be inserted through opening 26 to urge the back of the cassette 17 forward past tab 22 while holding tab 25 open with the thumb.

Figure 5:
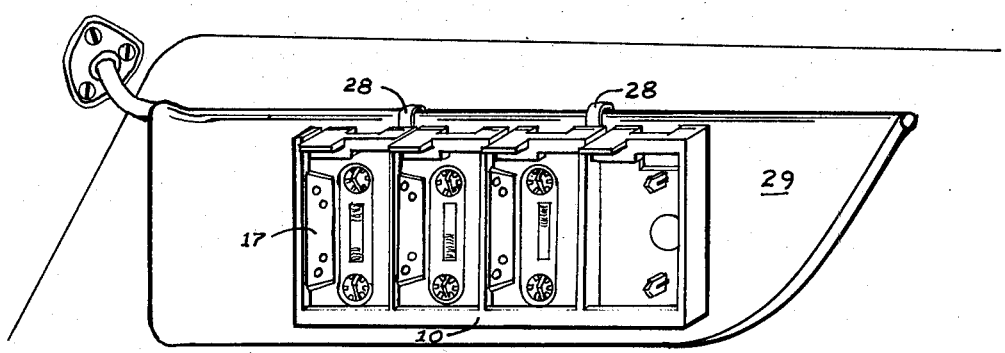
FIG. 5 is a perspective view from the front showing the way the holder is typically mounted on the rear flat surface of a sun visor.

The entire holder 10 is mounted to the flat side of the sun visor of a motor vehicle (see FIG. 5) or other suitable mounting surface by means of metal clips 28 which are fastened to the back the the holder 10, extend past the movable wall 19 and curve away from the holder in such a way that the clips 28 may be fastened over the edge of the sun visor 29 with the back 14 of the holder adjacent to the flat part of the sun visor 29 as a mounting surface. The unique feature of this holder will be preserved if alternative well-known methods of mounting such as straps, spring clips, sleeves, bolts, screws or adhesives are used, as long as the back 14 is adjacent to the mounting surface and the flat side of the cassettes are parallel to the mounting surface.

Figure 3:
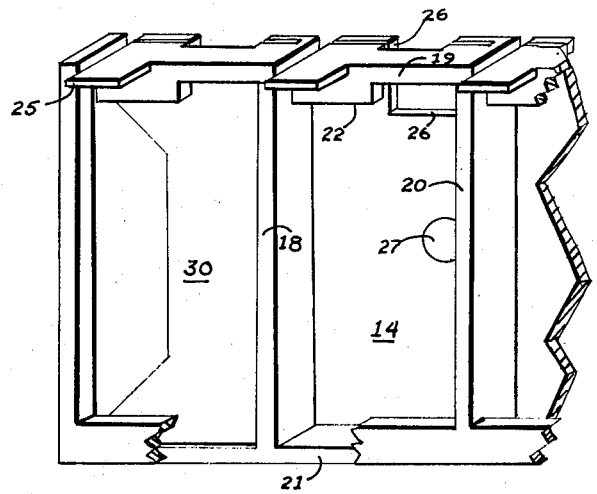
FIG. 3 is a fragmentary view in perspective from the front of a further embodiment of the present invention without detents.

It is within the purview of the present invention to provide a holder which will accommodate a cassette, a cartridge, or the rectangular boxes in which cassettes or cartridges are usually sold. Such embodiments are shown in FIG. 3, and differ from that of FIGS. 1 through 5 only in the absence of detents 13 and the dimensions of the frame 11 which are enlarged to receive the specific cartridge or rectangular box 30.

Another variation of this method for holding the cassette in the frame 11 is to eliminate tabs 22 and 23, the standoff 27, and attach wall 19 at both ends and the back so it is no longer movable (see FIG. 7). The cassette will be held by two parallel tracks 31 and 32 extending from front to back along opposing walls 19 and 21. The dimensions between opposing tracks 31 and 32 on opposing walls 19 and 21 is slightly smaller than the external dimensions of the cassette 17 which is being inserted, creating a force fit between the cassette 17 and tracks 31 and 32 which holds the cassette 17 by means of friction.

Another variation of the form of the cassette holder is (see FIG. 8) to form the frames 11 by well known methods for heat sealing a back sheet 33 and shorter front sheet 34 of polyvinyl plastic such that walls 18, 20, and 21 are formed by the seams of the heat seal. The front sheet 34 effectively becomes tab 23, and the back sheet 33 is folded 180° toward the front to form tab 22 and movable wall 19. The dimensions of the frame are larger than the cassette 17, so that front 34 and back 33 sheets spread to permit insertion of the cassette 17.

Having thus fully described the invention, what is claimed as new and desired to be secured by Letters Patent of the United States, is:

1. A tape cassette or cartridge holder for attachment to the sun visor of a motor vehicle as a mounting surface in such a way that the flat side of the cassette or cartridge (perpendicular to the axis of the tape reels) is closest to the flat side of the mounting surface, comprising a frame, or several frames joined side-by-side, of resilient material such as plastic, consisting of:
    (a) A back;
    (b) Peripheral upstanding wall members connected to the back;
    (c) Tabs on two walls at opposed ends of the frame to overlie and retain the cassette or cartridge within the frame;
    (d) One wall which is attached to the frame on only one side so that it will pivot freely around the point of attachment to control the retention of the cassette or cartridge in two perpendicular axes of motion and allow the item being held to be removed in a direction perpendicular to the back of the frame without further movement of the remaining upstanding walls when the movable wall is pushed a sufficient distance so that the retaining tab no longer extends over the cartridge or cassette, and the resilience of the material of that wall acting as a spring to return it toward its original position when pressure is removed;

and fastened to the mounting surface by a clip or other suitable mounting device so that the back of the frame is adjacent to the flat portion of the mounting surface.

2. A holder according to claim 1 which has receiving detents carried by the back which fit into the circular openings of the reel within the cassette or cartridge so that the reels may not turn.

* * * * *